US012604061B2

(12) United States Patent (10) Patent No.: US 12,604,061 B2
Woodworth et al. (45) Date of Patent: Apr. 14, 2026

(54) CLOSED CAPTIONING SUMMARIZATION

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 18/971,864

(22) Filed: Dec. 6, 2024

(65) Prior Publication Data

US 2025/0193493 A1     Jun. 12, 2025

Related U.S. Application Data

(60) Provisional application No. 63/609,011, filed on Dec. 12, 2023.

(51) Int. Cl.
H04N 21/4722     (2011.01)
H04N 21/25     (2011.01)
H04N 21/431     (2011.01)

(52) U.S. Cl.
CPC ....... H04N 21/4722 (2013.01); H04N 21/251 (2013.01); H04N 21/4316 (2013.01)

(58) Field of Classification Search
None
See application file for complete search history.

(56) References Cited

U.S. PATENT DOCUMENTS

| | | | | |
|---|---|---|---|---|
| 9,992,556 B1 * | 6/2018 | Price | .................. | H04N 21/4302 |
| 12,200,316 B2 * | 1/2025 | Dorsey | .......... | H04N 21/440281 |
| 2013/0227401 A1 * | 8/2013 | Kandekar | ............. | G06F 40/169 |
| | | | | 715/254 |
| 2017/0094339 A1 * | 3/2017 | Landow | ............. | H04N 21/8126 |
| 2020/0304888 A1 * | 9/2020 | Panchaksharaiah | ......................... | |
| | | | | H04N 21/44218 |
| 2022/0132179 A1 * | 4/2022 | Bennett-James | ........................... | |
| | | | | H04N 21/26603 |
| 2022/0256209 A1 * | 8/2022 | Vartakavi | ............. | G11B 27/322 |
| 2022/0272425 A1 * | 8/2022 | Puniyani | ............ | H04N 21/8549 |
| 2022/0345797 A1 * | 10/2022 | Zavesky | ........... | H04N 21/4532 |
| 2022/0414133 A1 * | 12/2022 | Chandrashekar | .. | H04N 21/4856 |
| 2023/0007368 A1 * | 1/2023 | Chandrashekar | .. | H04N 21/4532 |
| 2024/0380941 A1 * | 11/2024 | Aher | ................ | H04N 21/44008 |

* cited by examiner

*Primary Examiner* — Alexander Q Huerta

(57)     ABSTRACT

Systems and methods for providing closed captioning summarization. Various options may be provided to summarize different portions of a media item (e.g., a last 5 minutes, the last 15 minutes, from the beginning of the show). Upon receiving a request for a summary, a closed captioning summarization service may extract a portion of closed captions of a corresponding closed caption file and generate a prompt for a language model (LM) instructing the language model to summarize the extracted portion. A summary received from the LM may be presented on a display concurrently with the media item to provide a recapitulation of a desired portion of the media item to the user without disrupting play of the media item.

17 Claims, 4 Drawing Sheets

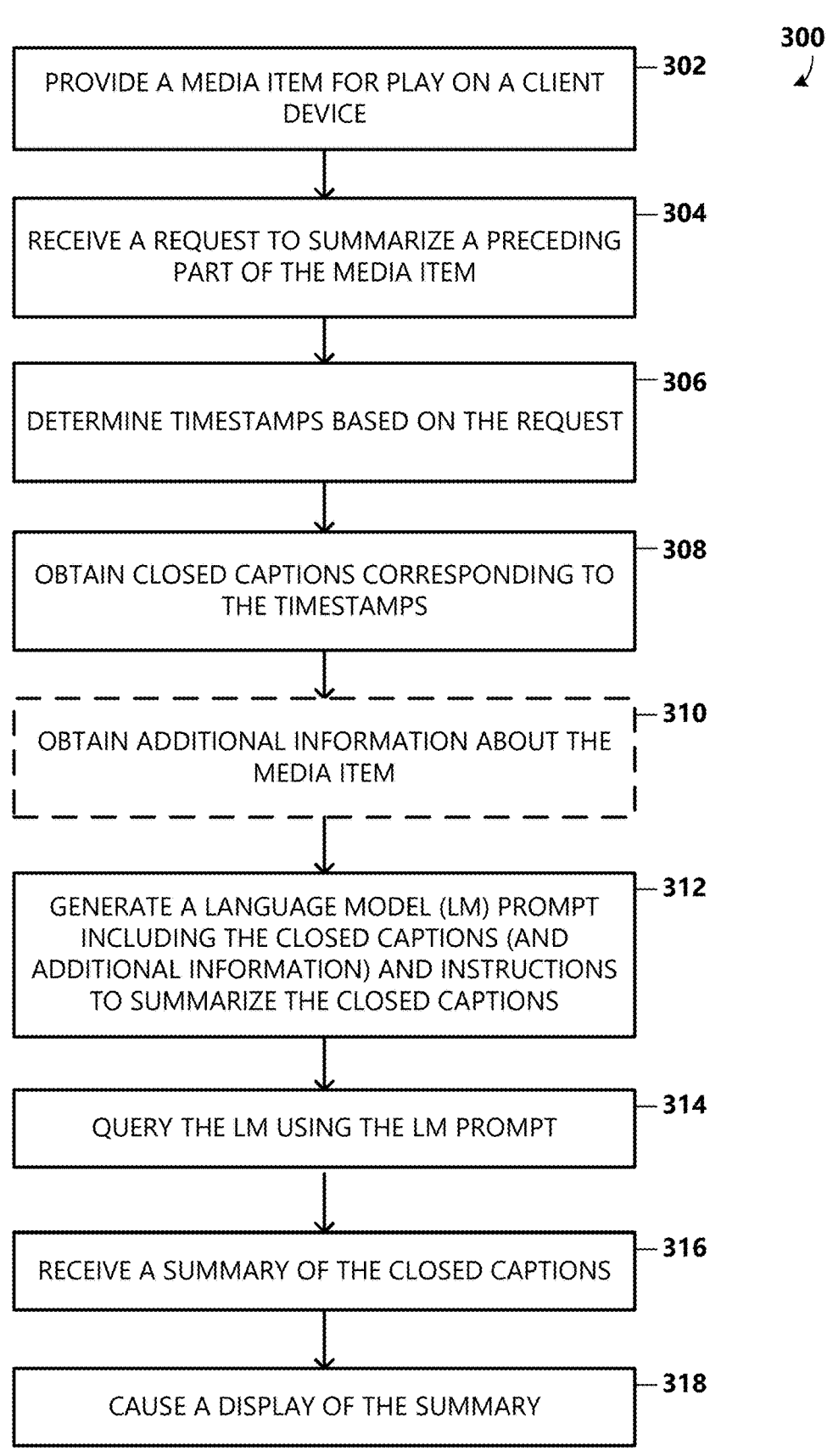

300

302 — PROVIDE A MEDIA ITEM FOR PLAY ON A CLIENT DEVICE

304 — RECEIVE A REQUEST TO SUMMARIZE A PRECEDING PART OF THE MEDIA ITEM

306 — DETERMINE TIMESTAMPS BASED ON THE REQUEST

308 — OBTAIN CLOSED CAPTIONS CORRESPONDING TO THE TIMESTAMPS

310 — OBTAIN ADDITIONAL INFORMATION ABOUT THE MEDIA ITEM

312 — GENERATE A LANGUAGE MODEL (LM) PROMPT INCLUDING THE CLOSED CAPTIONS (AND ADDITIONAL INFORMATION) AND INSTRUCTIONS TO SUMMARIZE THE CLOSED CAPTIONS

314 — QUERY THE LM USING THE LM PROMPT

316 — RECEIVE A SUMMARY OF THE CLOSED CAPTIONS

318 — CAUSE A DISPLAY OF THE SUMMARY

FIG. 3

410 PROCESSING UNIT

420 SYSTEM MEMORY

430 OPERATING SYSTEM

440 PROGRAM MODULES

CLOSED CAPTIONING SUMMARIZATION SERVICE
110

460 REMOVABLE STORAGE

470 NON-REMOVABLE STORAGE

480 COMMUNICATION SYSTEMS

490 INPUT/OUTPUT DEVICES

400 COMPUTING DEVICE

495 OTHER COMPUTING DEVICES

CLOSED CAPTIONING SUMMARIZATION

CROSS-REFERENCE TO RELATED APPLICATIONS

This application claims the benefit of U.S. Provisional Application No. 63/609,011, filed Dec. 12, 2023, entitled "Closed Captioning Summarization," which is incorporated herein by reference in its entirety.

BACKGROUND

Closed captioning includes displaying text on a display screen to provide a written representation of audio content of a media item (e.g., television program, movie, or other form of media content). For instance, closed captioning may be used to assist users with hearing impairments, allowing them to read dialogue, sound effects, and other audio information. Closed captions may also help individuals who are learning a new language or are in a noisy environment where it may be difficult to hear the audio of the media item clearly.

It is with these observations in mind, among others, that aspects of the present disclosure were conceived.

SUMMARY

The present disclosure describes a system and method for providing closed caption summarization. In some cases, when viewing a media item, a user may miss a part of the media item and may want to catch up on what was missed. Rewinding the media item to a point of missed dialog or action may be disruptive to other viewers. Thus, closed captioning summarization may be provided to provide a summary of closed captions for a preceding part of the media item.

One aspect of the present disclosure includes a method for providing closed captioning summarization, comprising: method for providing closed captioning summarization, comprising: receiving a selection to summarize a preceding part of a media item; determining at least one timestamp corresponding to the selected preceding part; obtaining closed captions corresponding to the at least one timestamp; generating a language-model (LM) prompt including the closed captions and instructions to summarize the closed captions; providing the LM prompt to an LM; receiving, from the LM, a summary of the closed captions; and causing a display of the summary on a display screen.

Another aspect of the present disclosure includes a system for providing closed captioning summarization, comprising: a processing system; and memory storing instructions that, when executed by the processing system, cause the system to receive a selection to summarize a preceding part of a media item; determine at least one timestamp corresponding to the selected preceding part; obtain a portion of closed captions corresponding to the at least one timestamp; generate summarization instructions to summarize the closed captions portion; include, in a language-model (LM) prompt, the summarization instructions and the closed captions portion; provide the LM prompt to an LM; receive, from the LM, a summary of the closed captions portion; and cause a display of the summary on a display screen.

Another aspect of the present disclosure includes a computer readable medium comprising instructions, which when executed by a computer, cause the computer to: A computer readable medium comprising instructions, which when executed by a computer, cause the computer to: receive a selection to summarize a preceding part of a media item;

determine at least one timestamp corresponding to the selected preceding part; obtain a portion of closed captions corresponding to the at least one timestamp; generate summarization instructions to summarize the closed captions portion; include, in a language-model (LM) prompt, the summarization instructions and the closed captions portion; provide the LM prompt to an LM; receive, from the LM, a summary of the closed captions portion; and cause a display of the summary on a display screen.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

FIG. 3 is a flowchart illustrating operations of a method for providing closed caption summarization according to an example.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Examples of the present disclosure describe systems and methods for providing closed captioning summarization. In some examples, closed captioning summarization may be provided as a service, where a user of a streaming service may select to receive a summarization of a preceding part of a media item. In examples, various options may be provided to summarize different portions of the media item (e.g., the last 5 minutes, the last 15 minutes, from the beginning of the show). Upon receiving a request for a summary, a closed captioning summarization service may extract a portion of closed captions of a corresponding closed caption file and generate a prompt for a language model instructing the language model to summarize the extracted portion. A received summary may be presented on a display to provide a recapitulation of the missed portion of the media item to the user.

Figure 1:
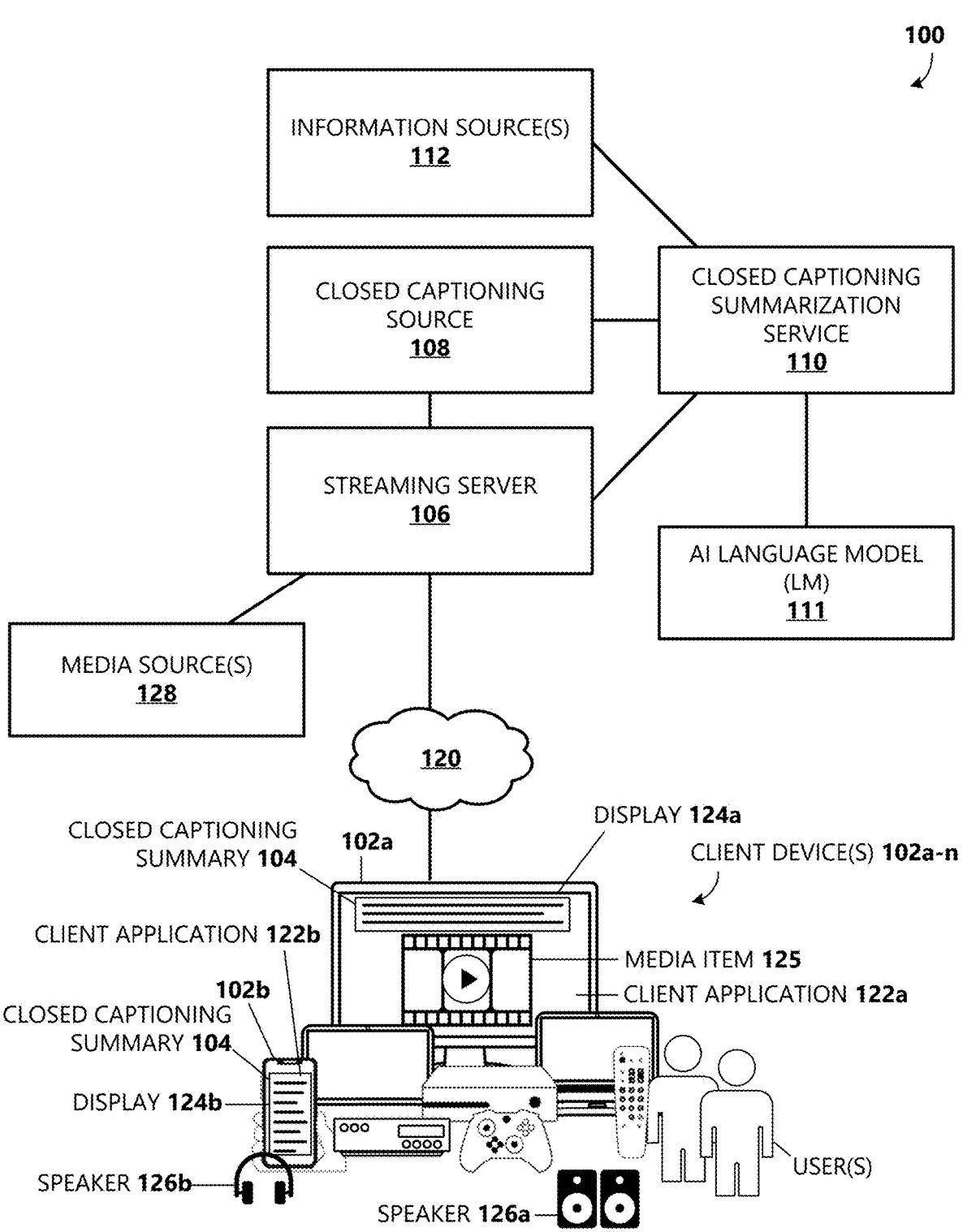
FIG. 1 is a block diagram showing an example system in which a system may be implemented for providing closed caption summarization according to an example.

With reference now to FIG. 1, an example network system 100 is described in which a closed captioning summarization service 110 may be implemented for providing closed captioning summarization. In an example implementation, the system 100 includes one or more client devices 102a-102n (collectively, client devices 102) communicatively connected to a streaming server 106 via one or a combination of networks 120. The client device(s) 102 may include a computing or media streaming device, such as a smartphone, a personal computer, a tablet, a gaming console, a smart television, a set-top box, etc. In examples, a client application 122a and 122b (collectively, client application 122) operates on the client device(s) 102 that accesses information and streams media content from the streaming server 106. For instance, the client application 122 provides an interface between the streaming server 106 and users and may provide a platform for browsing, selecting, and playing available media items 125 (sometimes also referred to herein as media content or media content items). Media items 125 may include audio and video streams of live and/or on-demand video (e.g., movies, shows, television programs, sporting events), game content, and/or other types of playable content. According to examples, the client application 122 plays streams of media items 125. The client application 122 may be a dedicated application, an internet browser, an operating system module, or other system operative to consume at least a subset of a total media item 125 and play the included audio and video for presentation to a user in real-time, live, or on-demand. In further examples, the client application 122 may further download and store a media item 125 locally on the client device 102. According to examples, the client device 102 may include or be operatively connected to a display 124a and 124b (collectively, display 124) via which media items 125, closed captions, and other content may be displayed. The client device 102 may further include or be operatively connected to a speaker 126a and 126b (collectively, speaker 126) via which audio of media items 125 may be played. The client device 102 includes an operating system that provides a graphical user interface (GUI) that allows users to interact with the client device 102 via graphical elements, such as display areas, buttons, icons, and the like. For example, the graphical elements are displayed on a display 124 of the client device 102 and can be selected and manipulated via user inputs. According to examples, the client device 102 includes or is in communication with a variety of input device types (e.g., remote control, keyboard, mouse, stylus, touchscreen, microphone, camera) that receive various types of user inputs (e.g., button selections, cursor selections, touch inputs, spoken and other audible inputs, gesture inputs, user focus inputs).

In some examples, the streaming server 106 may be associated with a media provider that provides media items 125 for display/play to users. In some examples, the media provider provides subscriptions to a streaming service, where subscribers may be charged a monthly fee to receive access to media items 125. In other examples, media items 125 may be accessed from the streaming server 106 on a pay-per-view basis. In other examples, the media items 125 may be purchased. In further examples, media items 125 may be accessed from the streaming server 106 for free and may include advertisements that are played with the media items 125. The media items 125 may be provided to the streaming server 106 by one or a plurality of media sources. For instance, a media source 128 may own or hold rights to a media item 125, which may include distributing and/or profiting from distribution of the media items 125. In some examples, the media source(s) 128 are separate from the streaming server 106. In other examples, the streaming server 106 and one or more media sources 128 may be operated by a same entity on a same server or group of servers. According to examples, the streaming server 106 may store one or various copies of media items 125 in one or more media item data stores.

In further examples, the streaming server 106 may be in communication with one or more closed captioning sources 108 that provide closed caption files of media items 125 to the streaming server 106. The streaming server 106 may provide a corresponding closed caption file with a media item 125 to a client application 122. In examples, the closed caption files may include closed captioning text (referred to herein as closed captions) and timing data (e.g., timestamps) indicating when a block of closed captions should be displayed and removed from display. A user may enable or display closed captioning as desired, where when enabled, the client application 122 may read the closed caption file along with the media item 125 and display the media item 125 and closed captions accordingly. The closed captions are synchronized with the audio and may be displayed as a line or multiple lines of text on the display 124. In some examples, closed captions may be displayed along a bottom side of the display 124. In other examples, closed captions are displayed along another side of the display 124 or in a designated display area. In examples, the closed captions include transcribed speech elements (e.g., corresponding to spoken dialogue in the media item 125). The closed captions may further include transcribed non-speech elements, such as speaker identifications, sound descriptions of audio content (e.g., music, sound effects). In further examples, the closed captions may include stage directions and/or other information associated with understanding a plot of the media item 125. For instance, closed captioning may include dialogue, sound effects, and other audio information that may be used to assist users with hearing impairments or in noisy environment where it may be difficult for a user to hear the audio of the media item 125 clearly. In some examples, metadata is included in a closed caption file that includes information about visual elements of the media item 125, such as positions of characters on the display 124. In other examples, visual (e.g., position) information may be obtained from an external information source 112 or by applying computer vision algorithms and performing scene analysis of the media item 125.

In an example implementation, the streaming server 106 includes or is in communication with the closed captioning summarization service 110, where the closed captioning summarization service 110 generates and provides summarizations of media items 125 to users. In some examples, the client application 122 provides one or more selectable options for rewinding closed captions to a preceding part of the media item 125. For instance, various closed captioning rewind options may be associated with various amounts of time (e.g., 5 seconds(s), 10 s, 30 s, 1 minute (min), 5 min, 10 min) from a current time in which to go back. In some implementations, a selection of a closed captioning rewind option may cause the closed captioning summarization service 110 to desynchronize closed captions from the audio and, while the audio and video of the media item 125 continues to play on the client device 102, display the closed captions of the preceding part of the media item 125 corresponding to the selected amount of time on a same or another client device 102. In some examples, the media item 125 is displayed on a first display 124a and the closed captions are displayed on a second display 124b. In some examples, first display 124a may be included in or connected to a first client device 102 and the second display 124b may be included in or connected to a second client device 102 different than the client device. For instance, a user may be enabled to rewind only the closed captioning without disruption of playback of the media item 125. Accordingly, the user may catch a missed word or phrase without changing the flow of the action of the media item 125.

In another example implementation, the client application 122 provides one or more closed captioning summarization options to summarize a preceding part of the media item 125. For instance, various closed captioning summarization options may be associated with various time periods to recapitulate. A user selection of a closed captioning summarization option may be communicated to the closed captioning summarization service 110, where the closed captioning summarization service 110 may determine a current timestamp and a starting timestamp of the media item 125 based on the selected closed captioning summarization option. In examples, the closed captioning summarization service 110 may further obtain closed captions from the closed caption file for at least a portion of the media item 125 corresponding to the determined timestamps.

In some examples, the closed captioning summarization service 110 may communicate with one or more information sources 112 to obtain additional information about the media item 125. For instance, the obtained additional information may be used as context information for the obtained portion of closed captions. Examples of information sources 112 may include an online database or webpage that provides information about movies, television shows, actors, directors, screen plays, plot summaries, cast and crew information, release dates, ratings, reviews, trivia, and/or other information.

In examples, the closed captioning summarization service 110 may further query an artificial intelligence (AI) language model (LM) 111 for a summary of the portion of closed captions of the preceding part of the media item 125. In some examples, the LM 111 is a large language model (LLM) trained to understand and generate sequences of tokens, which may be in the form of natural language (e.g., human-like text). In various examples, the LM 111 can understand complex intent, cause and effect, perform language translation, semantic search classification, complex classification, text sentiment, summarization, summarization for an audience, and/or other natural language capabilities. In some examples, the LM 111 receives information from the closed captioning summarization service 110 in order to generate a summary. In some examples, the LM 111 also receives information directly from information sources 112, closed captioning source 108, and/or streaming server 106, and/or media sources 128 in order to generate a summary at the request of the closed captioning summarization service 110 (which may, e.g., provide metadata for the request and direct the LM 111 to the other data sources). In example implementations, the LM 111 operates on a computing device located remotely from the closed captioning summarization service 110. For instance, the closed captioning summarization service 110 may communicate with the LM 111 using one or a combination of networks 120.

According to examples, in response to querying the LM 111, the closed captioning summarization service 110 receives a summary of the closed captions (sometimes referred to herein as a closed captioning summary 104) from the LM 111. For instance, the closed captioning summary 104 may include an overview of main points, events, or storyline of the media item 125 based on the portion of closed captions corresponding to the selected closed captioning summarization option. According to examples, the closed captioning summarization service 110 causes the closed captioning summary 104 to be displayed on a display 124 to one or more users. The user(s) may be able to read the closed captioning summary 104 and be provided with an understanding of what the selected portion of the media item 125 is about without interruption to playback of the media item 125. Various options may be provided to adjust the length, detail, and/or focus of closed captioning summaries 104 generated by the closed captioning summarization service 110. For instance, based on selected options, the closed captioning summarization service 110 may instruct the LM 111 to generate a closed captioning summary 104 according to a desired length (e.g., last five minutes of the media item currently being played), amount of detail, and/or focus of the summary. Further details of the closed captioning summarization service 110 are described below with reference to FIGS. 2-4.

Figure 2:
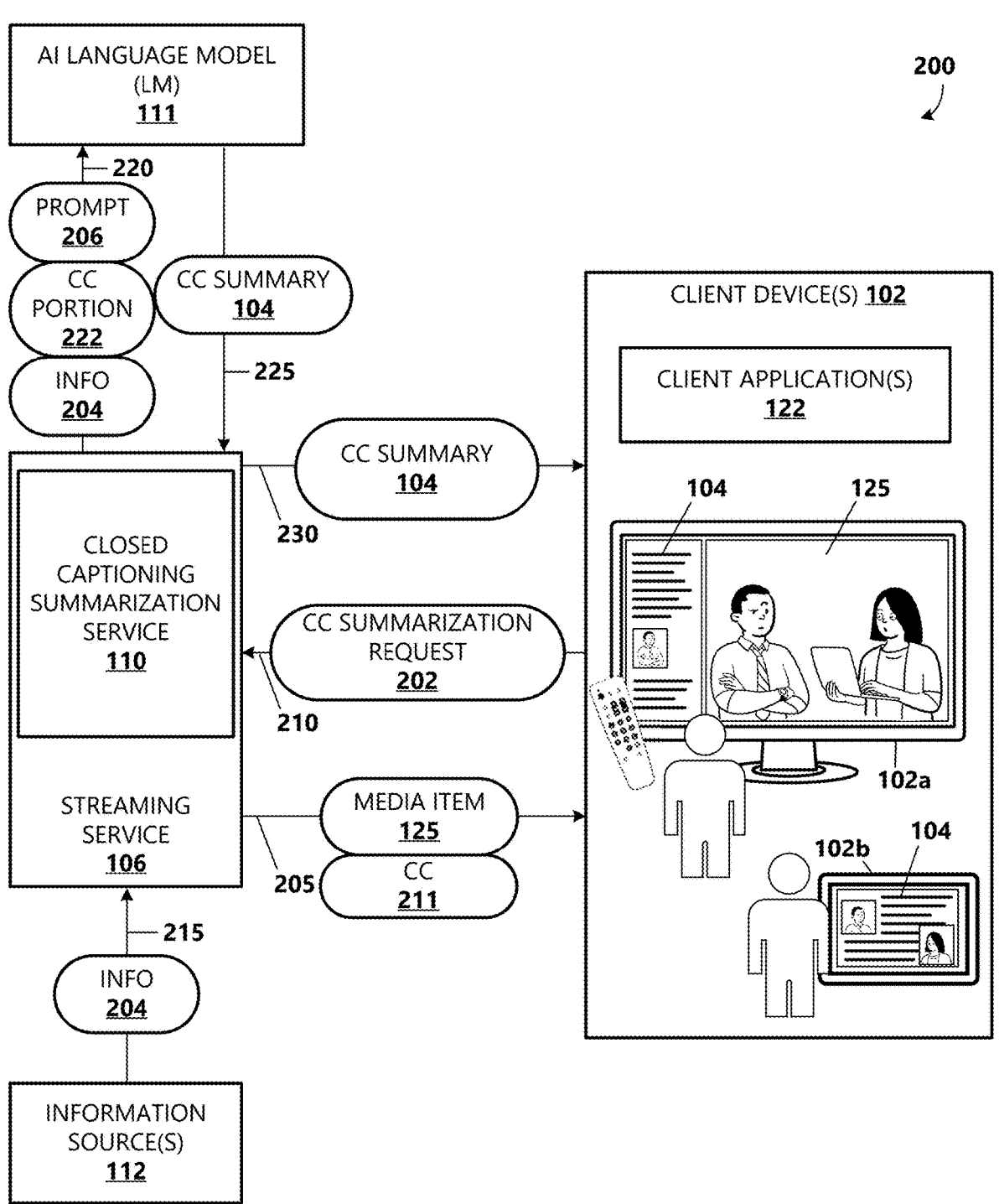
FIG. 2 is a block diagram showing an example data flow for providing closed caption summarization according to an example.

With reference now to FIG. 2, an example data flow 200 for providing closed captioning summarization is described according to an embodiment. In examples, one or more users may use a client application 122 operating on a first client device 102a to view a media item 125. Data communication 205 represents the media item 125 being streamed from the streaming server 106 to the first client device 102a. Additionally, a closed caption file 211 corresponding to the media item 125 may be provided to the first client device 102a. For instance, closed captioning may be enabled by a user of the first client device 102a, where the timed closed captions included in the file may be synchronized with the audio content of the media item 125 such that the closed captions appear onscreen at the appropriate time. In other examples, a closed captioning file 211 may be generated in real time during playback of the media item 125. For instance, closed captions are timestamped and saved to the closed captioning file 211 to synchronize to the audio and video of the media item 125.

In an example, a first user may want to receive a summary of a previous portion of the media item 125. For instance, the first user may have missed the previous portion and may want to have a recap without interrupting playback of the media item 125 (e.g., for a second user). Thus, the first user may use the client application 122 operating on the first client device 102a or may use the client application 122 operating on a second client device 102b to access one or more closed captioning summarization options. The client application 122 may present various closed captioning summarization options that may be selected for summarizing at least a portion of the media item 125. In some examples, the closed captioning summarization options may correspond to different time periods of the media item 125 to summarize. For instance, closed captioning summarization options may correspond to summarizing a portion of the media item 125 from a starting point to a current point (e.g., a previous scene, the last 5 min, the last 15 min, from the start of the media item 125). In some examples, the media item 125 may be a parent media item including a plurality of episodes. Accordingly, one or more closed captioning summarization options may correspond to summarizing an episode currently being streamed and/or one or more previous episodes of the parent media item. In other examples, closed captioning summarization options may correspond to various features of the media item 125 to summarize, such as character descriptions, character relationships, etc. Data communication 210 represents a communication of a closed captioning summarization request 202 transmitted to the closed captioning summarization service 110 in response to a selection of a closed captioning summarization option. The closed captioning summarization request 202 may further include a selection of one or more options corresponding to a desired summary length, amount of summary detail, or other desired feature of a summary.

In examples, when a closed captioning summarization request 202 is received, the closed captioning summarization service 110 may determine a current timestamp ($T_c$) and a starting timestamp ($T_s$). The current timestamp ($T_c$) may correspond to a time when the closed captioning summarization option was selected by the user. The starting timestamp ($T_s$) may correspond to a time prior to the current timestamp ($T_c$) based on the selected closed captioning summarization option. For instance, if a selection is made to summarize the last 5 min of the media item 125, the closed captioning summarization service 110 may determine a current timestamp ($T_c$) and a starting timestamp ($T_s$=$T_c$−5 min). In another example, if a selection is made to summarize a previous scene, the closed captioning summarization service 110 may determine the starting timestamp ($T_s$) based on metadata included in the media item 125, using a detection method for detecting a transition from one scene to another, or other methods. In some examples, the starting timestamp ($T_s$) may correspond to a time in a previous episode of the media item 125. In examples, the closed captioning summarization service 110 may further access the closed caption file 211 and extract at least a portion of the closed captions corresponding to the determined timestamps (e.g., between $T_s$ and $T_c$), herein referred to as closed caption portion 222.

For instance, data communication 215 represents a communication of additional information 204 provided to the closed captioning summarization service 110 that may be used as context information for the closed caption portion 222. In an example, the closed captioning summarization service 110 may request additional information 204 from the information source(s) 112 for information about actors, the director, plot summaries, cast and crew information, release dates, ratings, reviews, trivia, and/or other information about the media item 125.

According to examples, the closed captioning summarization service 110 may generate an LM prompt 206 used to query an LM 111 for a summary of the closed caption portion 222 of the media item 125. According to examples, in generating the LM prompt 206, the closed captioning summarization service 110 generates summarization instructions corresponding to summarizing the closed caption portion 222 of the media item 125. For instance, the summarization instructions may include directives to the LM 111, such as "summarize the following:". In some examples, the summarization instructions further include additional instructions, such as instructions for a desired summary length (e.g., "limit the summary to N words or less", where Nis a predetermined number), instructions for a desired amount of detail (e.g., "include a high level of detail"), instructions for a desired focus of the summary (e.g., "tell me who the characters are and their relationships to each other"), or other instructions.

In some examples, the closed captioning summarization service 110 may to obtain additional information 204 about the media item 125 and include the additional information 204 in the LM prompt 206 as context information for the closed caption portion 222. Context information may be included in the LM prompt 206 to help the LM 111 to understand context about the closed caption portion 222 of the media item 125, where the context can influence an interpretation and/or execution of a request to summarize the closed caption portion 222. As an example, the LM prompt

206 may include, "Given the following context:"+[additional information 204], +[summarization instructions (e.g., "summarize the following:")+[closed caption portion 222]. Data communication 220 represents a communication of the LM prompt 206 to the LM 111 and data communication 225 represents a communication of a closed captioning summary 104 generated by the LM 111 based on the LM prompt 206. In some examples, the closed captioning summarization service 110, instead of providing the closed caption portion 222, additional information 204, etc., to the LM 111, provides pointers to that information so that it can be retrieved directly by the LM 111.

In some examples, the closed captioning summarization service 110 may postprocess the received closed captioning summary 104. In an example implementation, the closed captioning summarization service 110 may parse the closed captioning summary 104 and separate the closed captioning summary 104 into different sections. For instance, when the closed captioning summary 104 includes information about characters of the media item 125, the closed captioning summarization service 110 may separate the closed captioning summary 104 into a plurality of portions, where each portion corresponds to a character. The closed captioning summarization service 110 may further determine position information of characters in the media item 125 (e.g., provided as metadata in the closed caption file 211 or determined via computer vision algorithms and/or scene analysis). For instance, a determination may be made as to positions of characters who are included in the closed captioning summary 104 in one or more upcoming scenes of the media item 125. The closed captioning summarization service 110 may further associate a character information portion of the closed captioning summary 104 with a timestamp of an upcoming scene and the position of the character in the upcoming scene. Other types of postprocessing operations are possible and are within the scope of the present disclosure.

As represented by data communication 230, the closed captioning summarization service 110 may further provide the closed captioning summary 104 to the requesting client application 122 operating on the first 102a or second client device 102b. For instance, the closed captioning summarization service 110 may cause the closed captioning summary 104 to be presented on the display 124 of the first 102a or second client device 102b. In some examples, such as when provided to the first client device 102a, the closed captioning summary 104 may be displayed in a designated area of the display 124 (e.g., along a side of the display).

In some examples, such as when portions of the closed captioning summary 104 are associated with a timestamp and position information, a portion of the closed captioning summary 104 may be displayed at a particular time and in a particular position. For instance, when the closed captioning summary 104 includes character information, a character information portion may be displayed upon display of the character in an upcoming scene, where the portion of the closed captioning summary 104 may be displayed (e.g., overlaid) near the character.

FIG. 3 is a diagram illustrating an example method 300 of providing closed captioning summarization. At operation 302, a media item 125 may be requested from a streaming server 106 and played by a client application 122 on a client device 102. In examples, the streaming server 106 provides the media item 125 and a closed caption file 211 to the client application 122. At operation 304, a request to summarize a preceding part of the media item 125 may be received. The request may be received in association with a user selection of a closed captioning summarization option. For instance, a user may select to summarize a preceding part of the media item 125, where the selection may include an indication of an amount of preceding time of the media item 125 to summarize.

At operation 306, timestamps for a closed caption portion 222 of the closed caption file 211 may be determined based on the request. For instance, a current timestamp ($T_c$) may be determined corresponding to a time when the request is made by the user for a summary. Additionally, a starting timestamp ($T_s$) for the closed caption portion 222 may be determined corresponding to an amount of time of the media item 125 the user would like to have recapped. At operation 308, a closed caption portion 222 of the closed caption file 211 is extracted based on the determined timestamps.

At optional operation 310, additional information 204 about the media item 125 may be obtained from one or more information sources 112, such as information about actors, the director, plot summaries, cast and crew information, release dates, ratings, reviews, trivia, and/or other information.

At operation 312, an LM prompt 206 may be generated including the closed caption portion 222, the additional information 204 (if obtained at operation 310), and summarization instructions to summarize the closed caption portion 222. For instance, the closed captioning summarization service 110 the summarization instructions included in the LM prompt may instruct an LM 111 to summarize the closed caption portion 222 based on context included in the additional information 204.

At operation 314, the LM prompt 206 may be communicated to the LM 111, and a response to the LM prompt 206 may be received by the closed captioning summarization service 110 at operation 316. For instance, the response from the LM 111 may include a summary of the closed caption portion 222 as requested. In some examples, the closed captioning summarization service 110 may perform one or more post-processing operations. For instance, the closed captioning summarization service 110 may parse and separate the closed captioning summary 104 include different portions and associate the different portions with timestamps and/or position information of characters or other objects in upcoming scenes of the media item 125.

At operation 318, a closed captioning summary 104 may be provided to the client application 122 and displayed on the display 124 of the client device 102. For instance, the client application 122 may display the closed captioning summary 104 concurrently with the media item 125 on the display 124 of a first client device 102a. In other examples, the client application 122 may be operating on a second client device 102b and may display the closed captioning summary 104 on the display 124 of the second client device 102b as the media item 125 is displayed on the display 124 of a first client device 102a. In some examples, portions of the closed captioning summary 114 are displayed at different times and at different positions on the display 124 based on associated timestamps and/or position information.

Figure 4:
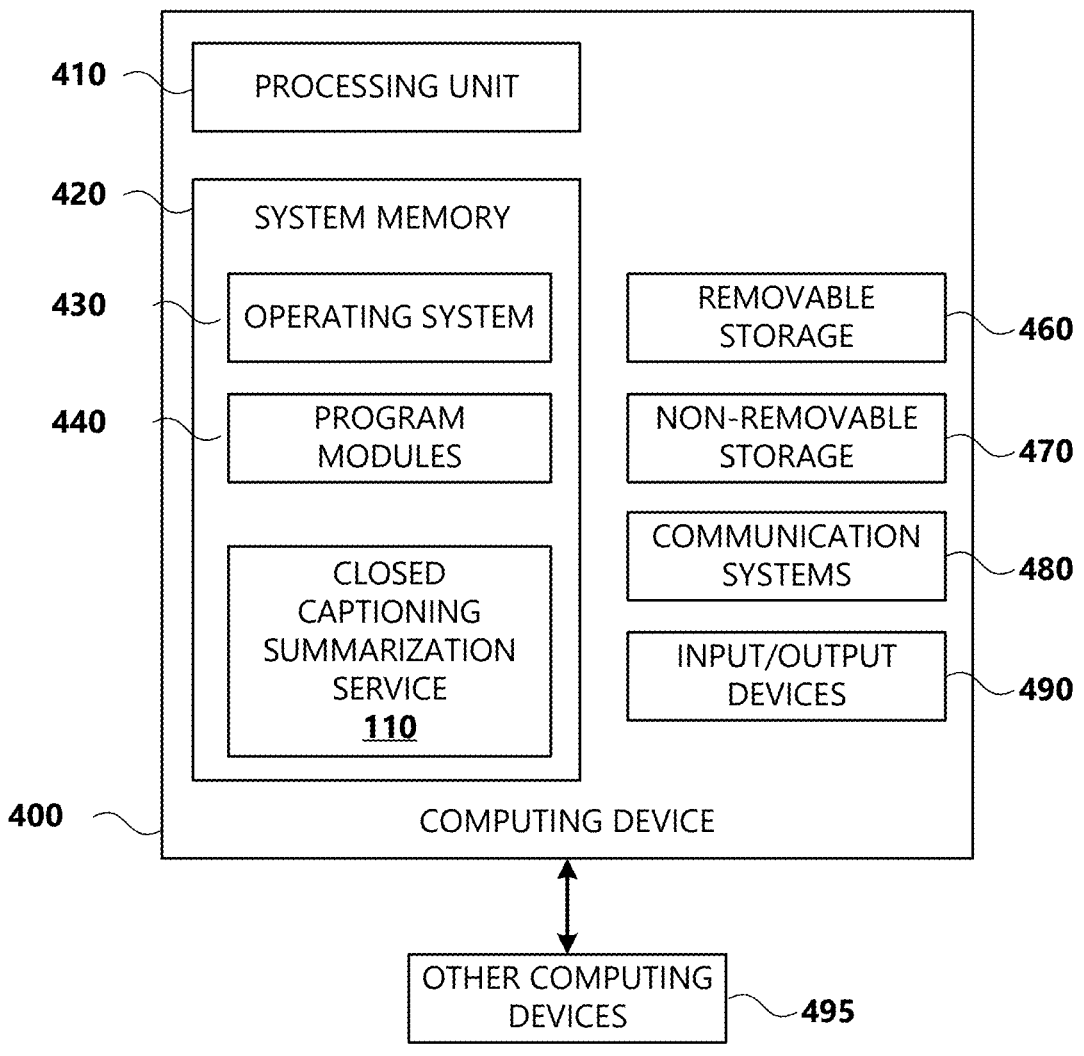
FIG. 4 is a block diagram of a computing device with which one or more aspects of the disclosure may be implemented.

FIG. 4 is a system diagram of a computing device 400 according to an example. The computing device 400, or various components and systems of the computing device 400, may be integrated or associated with the closed captioning summarization service 110. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for performing one more of the operations of the methods described above for providing robust network connectivity. A number of different program modules and data files may be stored in the system memory 420. While executing on the processing unit 410, the program modules 440 may perform the various processes described above. One example program module 440 includes the closed captioning summarization service 110.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A method for providing closed captioning summarization, comprising:

receiving a selection to summarize a preceding part of a media item;

determining at least one timestamp corresponding to the selected preceding part;

obtaining closed captions corresponding to the at least one timestamp;

generating a language-model (LM) prompt including the closed captions and instructions to summarize the closed captions;

obtaining information about characters of the media item;

including the information about the characters and instructions to generate descriptions of the characters in the LM prompt;

providing the LM prompt to an LM;

receiving, from the LM, a summary of the closed captions and a character description for each of the characters of the media item;

separating the summary into a plurality of portions, where each portion corresponds with a character description for one of the characters of the media item;

determining timestamps and position information corresponding to appearances of the characters of the media item in upcoming scenes of the media item;

causing a display of the summary on a display screen; and causing a display of each character description portion at a position near the corresponding character based on the timestamps and position information of the appearances of the characters in upcoming scenes.

2. The method of claim 1, wherein receiving the selection to summarize the preceding part of the media item comprises receiving a selection to summarize the media item from a starting point, the starting point including one of:

a start of the media item;

a time between the start and a current time; or a prior scene of the media item.

3. The method of claim 1, wherein:

the media item is an in-progress episode included in a plurality of episodes of a parent media item; and receiving the selection to summarize the preceding part of the media item comprises receiving a selection to summarize at least one preceding episode of the in-progress episode.

4. The method of claim 3, further comprising:

obtaining closed captions of the at least one preceding episode; and including the obtained closed captions of the at least one preceding episode and instructions to summarize the closed captions of the at least one preceding episode in the LM prompt.

5. The method of claim 1, further comprising:

obtaining additional information about the media item; and including, in the LM prompt, the additional information as context for the summary.

6. The method of claim 1, further comprising:

causing a display of one or more of the character descriptions of the characters on the display screen.

7. The method of claim 1, wherein causing the display of the summary on the display screen comprises displaying the summary on a same display screen on which the media item is displayed.

8. The method of claim 1, wherein causing the display of the summary on the display screen comprises displaying the summary on a display screen different from a display screen on which the media item is displayed.

9. A system for providing closed captioning summarization, comprising:

a processing system; and memory storing instructions that, when executed by the processing system, cause the system to:

receive a selection to summarize a preceding part of a media item;

determine at least one timestamp corresponding to the selected preceding part;

obtain a portion of closed captions corresponding to the at least one timestamp;

generate summarization instructions to summarize the closed captions portion;

include, in a language-model (LM) prompt, the summarization instructions and the closed captions portion;

provide the LM prompt to an LM;

receive, from the LM, a summary of the closed captions portion;

separate the summary into a plurality of portions, where each portion corresponds with a character description;

determine timestamps and position information corresponding to appearances of the characters in upcoming scenes of the media item; and cause a display of each character description portion at a position near the corresponding character based on the timestamps and position information of the appearances of the characters in upcoming scenes; and cause a display of the summary on a display screen.

10. The system of claim 9, wherein the closed captions include at least one of:

dialog;

stage directions;

speaker identification;

sound descriptions; and position information.

11. The system of claim 9, wherein the selection to summarize the preceding part of the media item comprises a selection to:

summarize the media item from a start of the media item;

summarize the media item from a time between the start of the media item and a current time;

summarize a prior scene of the media item; or summarize a preceding episode of a plurality of episodes of the media item.

12. The system of claim 9, wherein the instructions further cause the system to:

obtain additional information about the media item; and include, in the LM prompt, the additional information as context for the summary.

13. The system of claim 9, wherein the instructions further cause the system to:

obtain information about characters of the media item;

include the information about the characters and instructions to generate descriptions of the characters in the LM prompt; and cause a display of one or more of the descriptions of the characters on the display screen.

14. The system of claim 9, wherein the media item is displayed on a first display screen and the summary is displayed on a second display screen.

15. The system of claim 9, wherein the media item is displayed on the display screen and the summary is displayed in a designated area of the display screen.

16. A non-transitory computer readable medium comprising instructions, which when executed by a computer, cause the computer to:

receive a selection to summarize a preceding part of a media item;

determine at least one timestamp corresponding to the selected preceding part;

obtain a portion of closed captions corresponding to the at least one timestamp;

generate summarization instructions to summarize the closed captions portion;

include, in a language-model (LM) prompt, the summarization instructions and the closed captions portion;

obtain information about characters of the media item;

include the information about the characters and instructions to generate descriptions of the characters in the LM prompt;

provide the LM prompt to an LM;

receive, from the LM, a summary of the closed captions portion and descriptions of the characters;

separate the summary into a plurality of portions, where each portion corresponds with a character description;

determine timestamps and position information corresponding to appearances of the characters in upcoming scenes of the media item;

cause a display of each character description portion at a position near the corresponding character based on the timestamps and position information of the appearances of the characters in upcoming scenes; and cause a display of the summary on a display screen.

17. The non-transitory computer readable medium of claim 16, wherein the instructions further cause the computer to:

obtain additional information about the media item; and include, in the LM prompt, the additional information as context for the summary.

* * * * *